United States Patent
Shroff et al.

(10) Patent No.: US 10,823,854 B2
(45) Date of Patent: Nov. 3, 2020

(54) LOADING MULTI-RESOLUTION MAPS FOR LOCALIZATION

(71) Applicant: Zoox, Inc., Foster City, CA (US)

(72) Inventors: Nitesh Shroff, Millbrae, CA (US); Brice Rebsamen, San Jose, CA (US); Elena Stephanie Stumm, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 164 days.

(21) Appl. No.: 16/022,106

(22) Filed: Jun. 28, 2018

(65) Prior Publication Data
US 2020/0003901 A1     Jan. 2, 2020

(51) Int. Cl.
*G01S 17/89* (2020.01)
*G06T 17/20* (2006.01)
*G01S 17/06* (2006.01)
*G01S 17/58* (2006.01)

(52) U.S. Cl.
CPC .............. *G01S 17/89* (2013.01); *G01S 17/06* (2013.01); *G01S 17/58* (2013.01); *G06T 17/20* (2013.01); *G06T 2210/36* (2013.01)

(58) Field of Classification Search
CPC .... G01S 17/89; G01S 17/894; G06T 2210/36
See application file for complete search history.

(56) References Cited

U.S. PATENT DOCUMENTS

| | | | |
|---|---|---|---|
| 8,977,487 B2* | 3/2015 | Doi ................... | G08G 1/096827 701/410 |
| 2011/0172917 A1* | 7/2011 | Muzina ................ | G01C 21/367 701/455 |
| 2014/0163872 A1* | 6/2014 | Schilling ............... | G01C 21/32 701/527 |
| 2018/0005050 A1 | 1/2018 | Browning et al. | |
| 2018/0005407 A1* | 1/2018 | Browning .......... | B60W 30/095 |
| 2018/0189323 A1* | 7/2018 | Wheeler ............... | G01C 21/00 |
| 2019/0064826 A1* | 2/2019 | Matsui ................. | G05D 1/0246 |

(Continued)

FOREIGN PATENT DOCUMENTS

| RU | 2010107155 A | 9/2011 |
|---|---|---|
| WO | WO2017079228 A2 | 5/2017 |
| WO | WO2017079341 A2 | 5/2017 |

OTHER PUBLICATIONS

The PCT Search Report and Written Opinion dated Oct. 17, 2019 for PCT Application No. PCT/US2019/039267, 8 pages.

*Primary Examiner* — Anshul Sood
(74) *Attorney, Agent, or Firm* — Lee & Hayes, P.C.

(57) ABSTRACT

Techniques are discussed for using multi-resolution maps, for example, for localizing a vehicle. Map data of an environment can be represented by discrete map tiles. In some cases, a set of map tiles can be precomputed as contributing to localizing the vehicle in the environment, and accordingly, the set of map tiles can be loaded into memory when the vehicle is at a particular location in the environment. Further, a level of detail represented by the map tiles can be based at least in part on a distance between a location associated with the vehicle and a location associated with a respective region in the environment. The level of detail can also be based on a speed of the vehicle in the environment. The vehicle can determine its location in the environment based on the map tiles and/or the vehicle can generate a trajectory based on the map tiles.

20 Claims, 9 Drawing Sheets

(56) References Cited

U.S. PATENT DOCUMENTS

2019/0206122 A1* 7/2019 Zhan .................. G06T 9/00
2019/0227567 A1* 7/2019 Ko .................. G01C 21/32
2019/0353499 A1* 11/2019 Stenneth ............. G05D 1/0274
2020/0003897 A1 1/2020 Shroff et al.

* cited by examiner

LOADING MULTI-RESOLUTION MAPS FOR LOCALIZATION

BACKGROUND

Data can be captured in an environment and represented as a map of the environment. Often, such maps can be used by vehicles navigating within the environment, although the maps can be used for a variety of purposes. In some cases, an environment can be represented as a two-dimensional map, while in other cases, the environment can be represented as a three-dimensional map. In some cases, such maps can be stored locally in a vehicle or can be accessed remotely over a network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
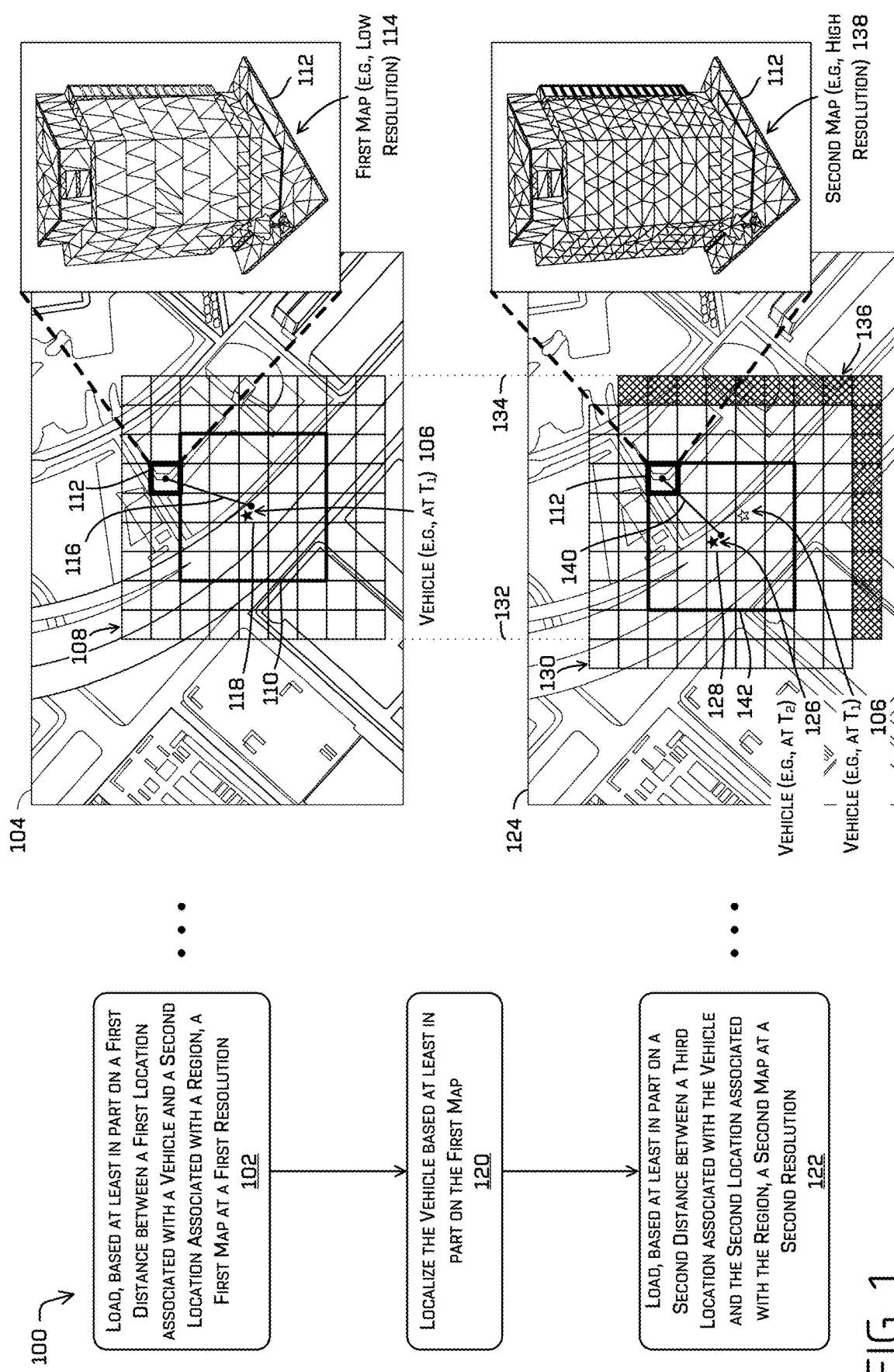
FIG. 1 is a pictorial flow diagram of an example process for determining a distance between a first location associated with an autonomous vehicle and a second location associated with a region in an environment, and loading map data into memory based at least in part on the distance, in accordance with embodiments of the disclosure.

This disclosure is directed to techniques for using multi-resolution maps for localizing a vehicle in an environment. In some examples, map data of an environment can be represented as discrete regions of data, which can each be referred to as a map tile. As a vehicle is traversing through an environment, a number of map tiles can be loaded into a memory of the vehicle so that captured sensor data representing the environment can be used to determine a location of the vehicle with respect to the map data. In some instances, a number of map tiles can be loaded into memory, whereby the map tiles represent an area of the environment around the vehicle. In some instances, a level of detail represented by the map tiles can be based at least in part on a distance between a location associate with the vehicle and a location associated with a respective region in the environment. That is, in some instances, for a first region that is above a threshold distance away from the location associated with the vehicle, a low-resolution map tile can be loaded into memory, while for a second region that is below a threshold distance from the location associated with the vehicle, a high-resolution map tile can be loaded into memory. The vehicle can determine its location in the environment based on the map tiles and/or the vehicle can generate a trajectory based on the map tiles.

In some examples, a determination can be made regarding 1) whether to load a map tile into memory, and, if so, 2) a level of detail associated with such a map tile. In some examples, the determination of whether to load a map tile into memory can be based at least in part on a location of the vehicle in an environment. In some examples, each location in an environment can be associated with a particular set of map tiles that has been precomputed or predetermined to contribute to localizing the vehicle. For example, a computing device can analyze sensor data captured by one or more vehicles to determine an optimal combination of map tiles that contribute to localizing the vehicle in the environment. In some examples, individual map tiles can be loaded into memory upon determining that the corresponding region of the environment is visible to one or more sensors of the vehicle. For example, map data corresponding to regions that are obscured by objects or by a building in an environment might not be loaded into memory, even if the regions of the environment are within a threshold distance of the vehicle.

After a determination that a map tile is to be loaded into memory, the determination can be made with respect to a level of detail of the map tile for which to represent the environment. In some instances, the vehicle can include a storage memory (e.g., a non-volatile memory such as a hard disk or hard drive) that includes, for each region of an environment, low-resolution map data and high-resolution map data. Thus, selecting a level of detail can include selecting either the low-resolution map data or the high-resolution map data to load into a working memory. In some instances, map data can include discrete features or regions that are associated with semantic information (e.g., indicating that the map data corresponds to a building, a sidewalk, a curb, a road, a tree, etc.). In such a case, the semantic information can be associated with a priority or a resolution level such that various features or regions of the map data can be loaded independent of the others. Accordingly, selecting a level of detail can include accessing features of a map tile associated with a priority level or with semantic information to load some or all of the map data into the working memory to be used for localizing the vehicle. As noted above, in some cases, a level of detail of map data to be loaded into memory can be based at least in part on a distance between a region in the environment and the vehicle in the environment.

In some instances, a level of detail to load into memory can be additionally or alternatively based at least in part on a speed of the vehicle as the vehicle traverses the environment. As can be understood, as the vehicle traverses the environment, a number of map tiles can be loaded and unloaded to and from memory. In one example, as a vehicle approaches a region in an environment (and a distance between the vehicle and the region is above a threshold distance), a first map tile associated with a first level of detail can be loaded into a memory of the vehicle and localization operations can be performed. As the vehicle navigates closer to the region (and the distance between the vehicle and the region is below a threshold), the first map tile associated with the first level of detail can be unloaded (e.g., deallocated, de-referenced, deleted, etc.) from memory, and a second map tile associated with a second level of detail can be loaded into the memory. At some point in this example, the vehicle may navigate away from the region (so that the distance between the vehicle and the region is again above the threshold distance), in which case, the second map tile may be unloaded from the memory while the first map tile may be loaded into memory. In sum, the vehicle may load a low-resolution map of the region, followed by a high-resolution map of the region, and followed by a low-resolution map of the region. However, as can be understood, in some instances, a speed of the vehicle may be above a threshold speed, in which case, the computing operations associated with loading and unloading map data from the memory may be unduly burdensome. In such a case, the operations may include loading a high-resolution map of the region (e.g., the second map tile associated with the second level of detail) without loading the low-resolution map before or after loading the high-resolution map. In some instances, when a speed is above a threshold speed, the operations can include loading additional tiles in a direction of movement of the vehicle.

As noted above, in some examples, a plurality of map tiles can be loaded into memory for localizing a vehicle. By way of example, a 9×9 grid of map tiles can be loaded into memory, with each tile representing a 25 meter×25 meter region of an environment, so that the map data loaded into memory represents a 225 meter×225 meter area around the vehicle. For example, and without limitation, a central portion of map tiles (in the 9×9 map tile example) loaded into memory, such as a 3×3 block of map tiles, can be represented by relatively higher level of detail, while map tiles in the outer periphery of the block can be represented by a relatively lower level of detail. As can be understood, the example number of tiles and size of tiles are not intended to be limiting, and a variety of configurations are considered herein. In at least some examples, low-resolution and high-resolution tiles may represent varying areas (e.g., a low-resolution tile may correspond to a 100 meter by 100 meter area), such that the system is able to incorporate additional information from lower-resolution tiles from further away.

In some examples, a distance between a first location associated with the vehicle and a second location associated with a region in the environment can be measured in a number of ways. For example, any point of the vehicle can be used as a first measurement location, including but not limited to, a center of a vehicle, a center of a rear axle of the vehicle, a corner of a vehicle, etc. In another example, any location associated with the region can be used as a second measurement location, including but not limited to, a centroid of the region, a geometric center of the region, a corner of a region, a closest point of the region to the vehicle, etc. In some examples, a distance between the vehicle and the region can be based at least in part on a distance between a center of a map tile where the vehicle is currently located and any location associated with the region. That is, in some cases, while a vehicle navigates within a map tile (e.g., a 25 meter×25 meter region of an environment), the distance between the first location associated with the vehicle and the second location associated with the region may remain the same. However, when the vehicle navigates to a new map tile, the first location associated with the vehicle can be updated, and the distance to other regions may be updated at that time. Additional examples and details are given throughout this disclosure.

In some examples, selecting a level of detail for map data, such as between a low-resolution map tile and a high-resolution map tile, can improve a functioning of a computer by reducing an amount of memory to be allocated to storing the map data in memory, while maintaining an accuracy or improving an accuracy of localizing the vehicle in an environment. For example, the map data can be loaded into a working memory, such as a random access memory or cache memory, associated with a graphics processing unit (GPU), which can be used to perform various localization algorithms, such as SLAM (simultaneous localization and mapping) and CLAMS (calibration, localization, and mapping, simultaneously). For the purpose of discussion, and continuing with the example above involving a 9×9 grid of map tiles, if one high-resolution map tile is 10 MB (megabytes), representing the area at highest resolution would require 810 MB (81*10 MB) of memory. However, assuming that one low-resolution map tile is 5 MB, a mixed-resolution map comprising a 3×3 high-resolution central portion surrounded by low-resolution tiles would require 450 MB (9*10 MB+72*5 MB). Thus, representing an area using various resolution map data can reduce an amount of memory to be used while maintaining or expanding a working range for localizing a vehicle. Of course, the values discussed herein are examples, and other implementations are contemplated herein.

A number of actions can be performed by an autonomous vehicle, robotic platform, and/or by a sensor system utilizing the techniques discussed herein. For example, upon loading map data associated with different levels of detail or resolutions as discussed herein, operations can include performing an action based at least in part on the map data and the sensor data, wherein the action includes at least one of a localization action, a perception action, a prediction action, or a planning action. In some instances, a localization action can include determining a location of the vehicle, sensor system, or robotic platform by using a localization algorithm such as SLAM or CLAMS. In some instances, a perception action can include, but is not limited to, identifying static objects or dynamic objects in an environment based at least in part on the map data (e.g. using the map data to perform background subtraction, discerning semantic information between points, and the like). In some instances, a prediction action can include generating one or more predictions about a state of one or more objects in the environment (or about the environment itself) such as, for example, incorporating map data as constraints for potential actions of detected agents. In some instances, a planning action can include generating a trajectory for the vehicle, sensor system, or robotic platform in an environment, such as, for example, incorporating the map data as constraints for potential vehicle trajectories.

The techniques discussed herein can improve a functioning of a computing device in a number of additional ways. As mentioned above, loading map tiles of varying resolution can reduce an amount of memory required to store map data and/or can increase a size of an area represented by a map without increasing a size of the memory. Further, improving memory characteristics of map data, as discussed herein, reduces energy consumption of processors operating on such data, and/or reduces an amount of heat generated by such processors, thereby reducing an amount of cooling required for such processors. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In another example, the techniques can be utilized in an aviation or nautical context, or in any system using machine vision (e.g., in a system using image data). Additionally, the techniques described herein can be used with real data (e.g., captured using sensor(s)), simulated data (e.g., generated by a simulator), or any combination of the two.

FIG. 1 is a pictorial flow diagram of an example process 100 for determining a distance between a first location associated with an autonomous vehicle and a second location associated with a region in an environment, and loading map data into memory based at least in part on the distance, in accordance with embodiments of the disclosure.

At operation 102, the process can include loading, based at least in part on a first distance between a first location associated with a vehicle and a second location associated with a region, a first map at a first resolution. In an example 104, a vehicle 106 is illustrated as traversing an environment at a first time ($T_1$). In some cases, and as discussed herein, the operation 102 can be based on one or more of: a distance between the vehicle and a location associated with the region, a distance between a location associated with the vehicle (e.g., a point associated with the region occupied by the vehicle) and the location associated with the region, or the region falling within an inner region of a map grid or the region falling within an outer region of a map grid, as discussed herein.

For the purpose of illustration, the vehicle 106 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 106 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 106 are described throughout this disclosure.

The example 104 illustrates the environment of the vehicle, as well as a map grid 108 representing a plurality of map tiles that are stored in memory corresponding to the environment. As can be understood, regions of the environment that correspond to the map grid 108 are represented by map data stored in a memory.

The map grid 108 comprises an inner region 110 as indicated by the bolded line illustrated around the inner 5×5 region of the map grid 108. In some instances, and as discussed herein, map data associated with the inner region 110 can be represented at a higher resolution or a higher level of detail. Accordingly, map data associated with the region between the inner region 110 and the periphery of the map grid 108 can be represented at a lower resolution or a lower level of detail.

An example region 112 is discussed herein. The region 112 can be represented by first map data 114, which comprises a three-dimensional (3D) mesh of a portion of the environment. In some instances, the 3D mesh data of the first map data 114 can represent an environment and objects in an environment (e.g., static and/or dynamic objects) using a plurality of polygons, though any other representation of the environment is contemplated (signed distance functions, point clouds, etc.). In some instances, a level of detail can correspond to a number of polygons in the 3D mesh. In some instances, a level of detail can correspond to a decimation level for simplifying aspects of the 3D mesh. Examples of 3D meshes and decimation techniques are discussed in U.S. patent application Ser. Nos. 15/913,647 and 15/913,686, filed Mar. 6, 2018. Application Ser. Nos. 15/913,647 and 15/913,686 are herein incorporated by reference, in their entirety.

In some cases, a first distance 116 between the first location associated with the vehicle 106 and a second location associated with the region 112 can meet or exceed a threshold distance. As illustrated, the first distance 116 represents a first location associated with a map tile 118 occupied by the vehicle 106 (e.g., a center of a map tile) and a second location associated with the region 112 (e.g., a center of the map tile). Of course, the first distance 116 can be determined using other metrics, as discussed herein.

At operation 120, the process can include localizing the vehicle based at least in part on the first map. For example, as the vehicle 106 traverses the environment in the example 104, the vehicle 106 can capture sensor data of the environment (e.g., LIDAR data, RADAR data, SONAR data, image data, etc.) and can use the sensor data in conjunction with a localization algorithm (e.g., SLAM, CLAMS, etc.) to localize the vehicle in the environment. For example, the vehicle 106 can compare sensor data with map data (e.g., the map data 114) to determine a location of the vehicle 106 in the environment. In some instances, based on the captured sensor data, the operation 120 may or may not be performed. That is, in some cases, the first map data 114 can be loaded into a working memory without the vehicle 106 utilizing the map data to localize the vehicle 106.

At operation 122, the process can include loading, based at least in part on a second distance between a third location associated with the vehicle and the second location associated with the region, a second map at a second resolution. In an example 124, the vehicle 106 is illustrated as a vehicle 126 at a second time, $T_2$. In the example 124, the vehicle 106 has moved from the region 118 of the environment to residing within a region 128 of the environment. Accordingly, the map grid 108 in the example 104 is updated as the map grid 130 to represent a different area around the vehicle 126. Alignment lines 132 and 134 illustrate the differences in alignment between the map grid 108 and the map grid 130.

For example, relative to the map grid 108, a left column of map tiles has been added to the map grid 130 (to the left of the alignment line 132) and a top row of map tiles has been added to the map grid 130. To maintain a size of the map grid 130 in a memory, a corresponding row and column of map tiles (indicated as an unloaded region 136) has been removed from the map grid 130. The unloaded region 136 is illustrated as a cross-hatched region of map tiles on the bottom and right regions in the example 124. In addition to adding and deleting regions of the environment to the map grid 130, for individual map tiles within the map grid 130, a level of detail or resolution can be upgraded or downgraded based on a distance from a particular region to a location associated with the vehicle 126.

As illustrated, the region 112 can be represented by second map data 138. As can be seen in FIG. 1, a level of detail of the second map data 138 is higher than a level of detail of the first map 114. That is, a number of polygons representing the 3D mesh in the second map 138 is higher than a number of polygons representing the 3D mesh in the first map data 114.

In some instances, the second map data 138 can be loaded into a working memory of the vehicle 126 based at least in part on a second distance 140 being below the threshold distance. For example, the second distance 140 may represent a distance between the center of the map tile 128 (e.g., where the vehicle 126 is located) and the center of the region 112. Of course, the second distance 140 can be measured against other reference points in the environment. In some instances, the second map data 138 can be loaded into memory based at least in part on the region 112 falling within an inner region 142 of the map grid 130.

As the vehicle 126 traverses through the environment, the map data 138 can be unloaded from memory and replaced by the first map data 114 (e.g., when a distance between a location associated with the vehicle 126 and the location associated with the region 112 meets or exceeds a threshold distance).

As can be understood, the process 100 can be performed substantially simultaneously in parallel for each region of an environment proximate to the vehicle 106 as the vehicle 106 traverses the environment.

Figure 2:
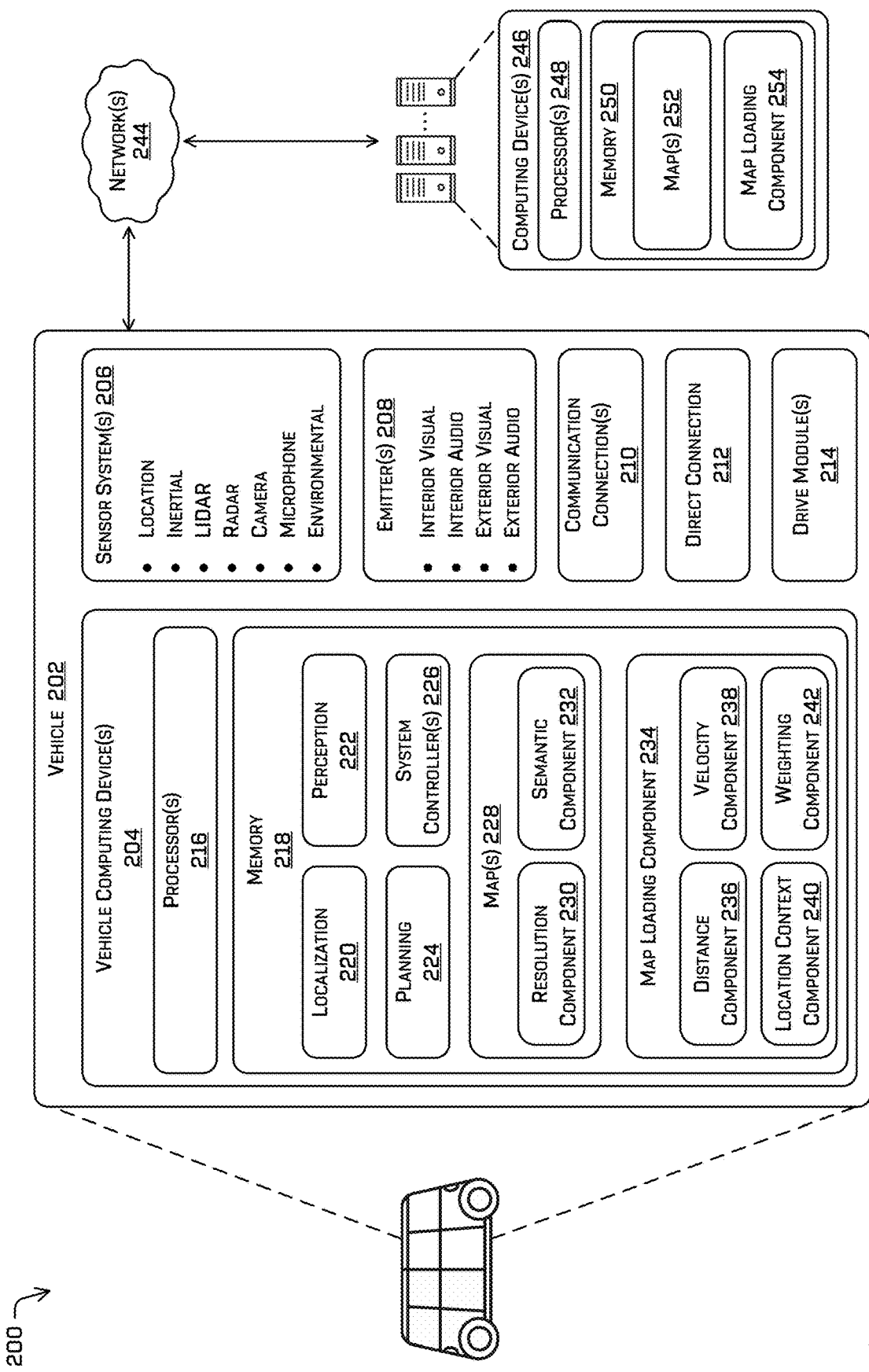
FIG. 2 depicts a block diagram of an example system for implementing the techniques described herein.

FIG. 2 depicts a block diagram of an example system 200 for implementing the techniques described herein. In at least one example, the system 200 can include a vehicle 202, which can correspond to the vehicle 106 in FIG. 1.

The vehicle 202 can include a vehicle computing device 204, one or more sensor systems 206, one or more emitters 208, one or more communication connections 210, at least one direct connection 212, and one or more drive modules 214.

The vehicle computing device 204 can include one or more processors 216 and memory 218 communicatively coupled with the one or more processors 216. In the illustrated example, the vehicle 202 is an autonomous vehicle; however, the vehicle 202 could be any other type of vehicle, or any other system having at least an image capture device (e.g., a camera enabled smartphone). In the illustrated example, the memory 218 of the vehicle computing device 204 stores a localization component 220, a perception component 222, a planning component 224, one or more system controllers 226, one or more maps 228 including a resolution component 230 and a semantic component 232, and a map loading component 234 including a distance component 236, a velocity component 238, a location context component 240, and a weighting component 242. Though depicted in FIG. 4 as residing in the memory 218 for illustrative purposes, it is contemplated that the localization component 220, the perception component 222, the planning component 224, the one or more system controllers 226, the one or more maps 228, the resolution component 230, the semantic component 232, the map loading component 234, the distance component 236, the velocity component 238, the location context component 240, and the weighting component 242 can additionally, or alternatively, be accessible to the vehicle 202 (e.g., stored on, or otherwise accessible by, memory remote from the vehicle 202).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a trajectory and/or for determining to load map data into memory, as discussed herein.

In some instances, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception component 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 224 can determine a path for the vehicle 202 to follow to traverse through an environment. For example, the planning component 224 can determine various routes and trajectories and various levels of detail. For example, the planning component 224 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate.

In some instances, the planning component 224 can include a prediction component to generate predicted trajectories of objects in an environment. For example, a prediction component can generate one or more predicted trajectories for vehicles, pedestrians, animals, and the like within a threshold distance from the vehicle 202. In some instances, a prediction component can measure a trace of an object and generate a trajectory for the object based on observed and predicted behavior.

In at least one example, the vehicle computing device 204 can include one or more system controllers 226, which can be configured to control steering, propulsion, braking, safety, emitters, communication, and other systems of the vehicle 202. These system controller(s) 226 can communicate with and/or control corresponding systems of the drive module(s) 214 and/or other components of the vehicle 202.

The memory 218 can further include one or more maps 228 that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 228 can include at least one map (e.g., images and/or a mesh). In some examples, the vehicle 202 can be controlled based at least in part on the maps 228. That is, the maps 228 can be used in connection with the localization component 220, the perception component 222, and/or the planning component 224 to determine a location of the vehicle 202, identify objects in an environment, and/or generate routes and/or trajectories to navigate within an environment.

In some examples, the one or more maps 228 can include the resolution component 230 and/or the semantic component 232. In some examples, the resolution component 230 can store, for each region of an environment, multiple maps associated with different resolutions or levels of detail. As illustrated in FIG. 1, the region 112 may be associated with the first map data 114 (e.g., a low-resolution map) and the second map data 138 (e.g., a high-resolution map). Of course, the resolution component 230 can store any number of maps associated with a region, and is not limited to one, two, or even three different resolution maps. That is, the resolution component 230 can store, for a particular region in an environment, low-resolution map data, medium-resolution map data, high-resolution map data, highest-resolution map data, and the like. In some examples, any number of resolutions of a tile may be dynamically determined as a function of any one or more of a distance, speed, direction of travel, semantic information, etc., such that any number of map gradations may be computed in real-time and/or precomputed to be stored. In some examples, a resolution of map data or a level of detail can correspond to a decimation level of a 3D mesh of the environment. For example, a high-resolution map can be associated with a low decimation level, while a low-resolution map can be associated with a high decimation level. In some examples, a high-resolution map may have a larger number of polygons comprising the 3D mesh compared to a low-resolution map.

The semantic component 232 of the one or more maps 228 component can include functionality to dynamically load features of a map into a working memory based at least in part on semantic information or priority information. For example, and as discussed below in connection with FIG. 6, different features of a 3D mesh (e.g., regions, polygons, etc.) can be associated with semantic information (e.g., building, sidewalk, road, curb, tree, etc.) or priority information (e.g., highest priority, medium priority, lowest priority). In some examples, data associated with different semantic information can be loaded into memory based at least in part on a distance or speed associated with the vehicle 202, as discussed herein. By way of example, and without limitation, a data associated with a building may be loaded into memory when a distance meets or exceeds a threshold distance, while data associated with a tree may not be loaded into working memory until the distance is below the threshold distance. Of course, these examples are not intended to be limiting, and other implementations are considered herein.

In some examples, the one or more maps 228 can be stored on a remote computing device(s) (such as the computing device(s) 246) accessible via network(s) 244. In some examples, multiple maps 228 can be stored based on, for example, a characteristic (e.g., type of entity, time of day, day of week, season of the year, etc.). Storing multiple maps 228 can have similar memory requirements, but increase the speed at which data in a map can be accessed.

In general, the map loading component 234 can include functionality to load map data based on characteristics of an environment and/or based on characteristics of the vehicle 202. In some instances, the map loading component 234 can intelligently determine which map tiles to load into working memory, and if so, can intelligently determine a level of detail of the map tile to load. Thus, the map loading component 234 can load a plurality of tiles into memory to respect memory constraints of the system while also allowing the vehicle to navigate through an environment using a map that meets or exceeds a range of sensors of the vehicle 202.

The distance component 236 can include functionality to select a resolution of a map tile based on a distance between the vehicle 202 and a region of the environment. For example, the distance component 236 can determine a first location associated with the vehicle in the environment. In some instances, the first location can correspond to a point in a map tile in which the vehicle 202 is currently located. In some instances, the point can be a center of the map tile, on an edge of a map tile, or any point associated with the map tile. Similarly, the distance component 236 can determine a second location associated with the region of the environment. For example, the second location can correspond to a point in the region, such as the center of the region, an edge of the region, or any point associated with the region. In some instances, the distance component 236 can determine the distance based at least in part on the region falling within an interior region of a map grid (e.g., the region 110 associated with the map grid 108). In some instances, the distance component 236 can determine to load a first map tile associated with a first level of detail based on the distance meeting or exceeding a threshold distance, while determining to load a second map tile associated with a second level of detail based on the distance being under the threshold distance. In some instances, the threshold distance can be set based on a number of localization points in an environment, on a size of memory to be allocated to storing map data, a speed of the vehicle, a time of data, weather conditions, and the like.

The velocity component 238 can include functionality to determine a velocity of the vehicle 202 and to select a level of detail associated with a map tile based at least in part on the velocity. For example, and as discussed above, loading and unloading map tiles to and from memory can be associated with a resource cost. As the velocity of the vehicle 202 increases above a threshold velocity (or threshold speed), an amount of time to perform the loading/unloading operations in memory may increase relative to the amount of time the vehicle 202 occupies a map tile. In some instances, as the speed of the vehicle meets or exceeds a threshold speed, the velocity component 238 can prevent a low-resolution map tile from being loaded into memory and may instead load a high-resolution tile into the memory, thereby obviating at least one loading/unloading cycle. In some instances, the velocity component 238 can affect the loading of map tiles as the vehicle 202 approaches a region (transitioning from low-resolution to high-resolution) or can affect the loading of map tiles as the vehicle 202 navigates away from the region (transitioning from high-resolution to low-resolution). In at least some instances, the velocity component 238 may determine whether to load a low- or high-resolution tile (or any resolution tile) based, at least in part, on a direction of travel in addition to the speed associated with the system such that more data (e.g., higher resolution data) is provided in a direction of travel and such that sufficient data is available to the system relative to the speed.

The location context component 240 can include functionality to determine a particular set of map tiles to load into memory based at least in part on a location of the vehicle 202 in the environment. For example, the location context component 240 can determine, for a current location of the vehicle 202, a set of map tiles around the vehicle 202 that facilitates localizing the vehicle 202 in the environment. In some instances, the location context component 240 can receive a list of map tiles from the computing device 246. That is, the computing device 246 can precompute or predetermine which map tiles are to be loaded into memory based on the location of the vehicle 202. In some instance, for a particular location of the vehicle 202, the map tiles to load can correspond to regions in the environment that can be sensed or viewed by sensors of the vehicle 202. For example, if a region of the environment is occluded by an obstacle or a building, the location context component 240 can determine not to load a map tile corresponding to the region.

In some instances, the location context component 240 can load one or more map tiles into memory based at least in part on route information associated with the vehicle 202. For example, even if a region cannot be sensed or viewed by one or more sensors of the vehicle 202, the location context component 240 can determine to load a map tile based on a route of the vehicle 202 traversing through or near a region of an environment. As a non-limiting example, if an area is occluded by a building, but the planned route turns at the building, relevant tiles can be loaded regardless of their current state of occlusion (e.g., based on a predetermined association, as discussed herein).

In some instances, the location context component 240 can select a resolution of a map tile to load based at least in part on running simulations at the computing device 246 and/or based at least in part on analyzing log files of vehicles to optimize a localization accuracy based on map data size.

In another example, the location context component 240 can select a resolution of a map tile based at least in part on a number of localization points in an environment (e.g., a threshold number of points). For example, the vehicle 202 can capture sensor data (e.g., LIDAR data) of an environment and use the sensor data to match captured sensor points with regions of the environment. If a number of localization points is below a threshold, the location context component 240 can increase a resolution of one or more map tiles in the memory to increase a probability of utilizing the map tile to localize the vehicle 202 in the environment. In another example, the location context component 240 can select a resolution of a map tile based at least in part on a localization confidence value being below a threshold value (or meeting or exceeding the threshold value).

In some instances, the location context component 240 can determine to load map tiles into memory based on static information (e.g., precomputed associations between map tiles) and/or based on dynamic information (e.g., whether a region of an environment is visible or sensed by a sensor of the vehicle 202).

The weighting component 242 can include functionality to associate localization weights with different map tiles in memory. For example, for map tiles that are above a threshold distance away from the vehicle 202, the weighting component 242 can downweight localization points associated with those map titles, such that those points influence various algorithms (e.g., localization algorithms) less than other points. In some instances, for map tiles that are below the threshold distance away from the vehicle 202, the weighting component 242 can upweight localization points associated with those map tiles such that those localization points contribute more to a particular algorithm (e.g., localization) than others. In some instances, a weight can be associated with particular map tiles and/or can be based on a resolution level or level of detail associated with a map tile.

As can be understood, the components discussed herein (e.g., the localization component 220, the perception component 222, the planning component 224, the one or more system controllers 226, the one or more maps 228 the resolution component 230, the semantic component 232, the map loading component 234, the distance component 236, the velocity component 238, the location context component 240, and the weighting component 242) are described as divided for illustrative purposes. However, the operations performed by the various components can be combined or performed in any other component.

In some instances, aspects of some or all of the components discussed herein can include any models, algorithms, and/or machine learning algorithms. For example, in some instances, the components in the memory 218 (and the memory 250, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 206 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device 204. Additionally or alternatively, the sensor system(s) 206 can send sensor data, via the one or more networks 244, to the one or more computing device(s) at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive module(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device 204 to another computing device or a network, such as network(s) 244. For example, the communications connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive modules 214. In some examples, the vehicle 202 can have a single drive module 214. In at least one example, if the vehicle 202 has multiple drive modules 214, individual drive modules 214 can be positioned on opposite ends of the vehicle 202 (e.g., the front and the rear, etc.). In at least one example, the drive module(s) 214 can include one or more sensor systems to detect conditions of the drive module(s) 214 and/or the surroundings of the vehicle 202. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 214. In some cases, the sensor system(s) on the drive module(s) 214 can overlap or supplement corresponding systems of the vehicle 202 (e.g., sensor system(s) 206).

The drive module(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive module(s) 214 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 214. Furthermore, the drive module(s) 214 also include one or more communication connection(s) that enable communication by the respective drive module with one or more other local or remote computing device(s).

In at least one example, the direct connection 212 can provide a physical interface to couple the one or more drive module(s) 214 with the body of the vehicle 202. For example, the direct connection 212 can allow the transfer of energy, fluids, air, data, etc. between the drive module(s) 214 and the vehicle. In some instances, the direct connection 212 can further releasably secure the drive module(s) 214 to the body of the vehicle 202.

In at least one example, the localization component 220, the perception component 222, the planning component 224, the one or more system controllers 226, the one or more maps 228, the resolution component 230, the semantic component 232, the map loading component 234, the distance component 236, the velocity component 238, the location context component 240, and the weighting component 242 can process sensor data, as described above, and can send their respective outputs, over the one or more network(s) 244, to one or more computing device(s) 246. In at least one example, the localization component 220, the perception component 222, the planning component 224, the one or more system controllers 226, the one or more maps 228, the resolution component 230, the semantic component 232, the map loading component 234, the distance component 236, the velocity component 238, the location context component 240, and the weighting component 242 can send their respective outputs to the one or more computing device(s) 246 at a particular frequency, after a lapse of a predetermined period of time, in near real-time, etc.

In some examples, the vehicle 202 can send sensor data to one or more computing device(s) 246 via the network(s) 244. In some examples, the vehicle 202 can send raw sensor data to the computing device(s) 246. In other examples, the vehicle 202 can send processed sensor data and/or representations of sensor data to the computing device(s) 246. In some examples, the vehicle 202 can send sensor data to the computing device(s) 246 at a particular frequency, after a lapse of a predetermined period of time, in near real-time, etc. In some cases, the vehicle 202 can send sensor data (raw or processed) to the computing device(s) 246 as one or more log files.

The computing device(s) 246 can include processor(s) 248 and a memory 250 storing a maps(s) component 252 and a map loading component 254.

In some instances, the map(s) component 252 can include functionality to generate maps of various resolutions and/or to generate semantic information associated with various features, regions, and/or polygons of a mesh, for example. In some instances, the map(s) component 252 can assign priority levels, weights, location information, etc. to aspects of map data to facilitate the selective loading of portions of the map data, as discussed herein. In some instances, the map(s) component 252 can perform the functions as discussed in connection with the map(s) component 228

In some instances, the map loading component 254 can include functionality to predetermine or precompute associations between map tiles for the purpose of loading map tiles that are relevant or otherwise contribute to localizing the vehicle 202 while the vehicle is at a particular location. In some instances, the map loading component 254 can perform the functions as discussed in connection with the map loading component 234.

The processor(s) 216 of the vehicle 202 and the processor(s) 248 of the computing device(s) 246 can be any suitable processor capable of executing instructions to process data and perform operations as described herein. By way of example and not limitation, the processor(s) 216 and 248 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 250 are examples of non-transitory computer-readable media. The memory 218 and 250 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 218 and 250 can include at least a working memory and a storage memory. For example, the working memory may be a high-speed memory of limited capacity (e.g., cache memory) that is used for storing data to be operated on by the processor(s) 216 and 248. In some instances, the memory 218 and 250 can include a storage memory that may be a lower-speed memory of relatively large capacity that is used for long-term storage of data. In some cases, the processor(s) 216 and 248 cannot operate directly on data that is stored in the storage memory, and data may need to be loaded into a working memory for performing operations based on the data, as discussed herein.

It should be noted that while FIG. 2 is illustrated as a distributed system, in alternative examples, components of the vehicle 202 can be associated with the computing device(s) 246 and/or components of the computing device(s) 246 can be associated with the vehicle 202. That is, the vehicle 202 can perform one or more of the functions associated with the computing device(s) 246, and vice versa.

Figure 3:
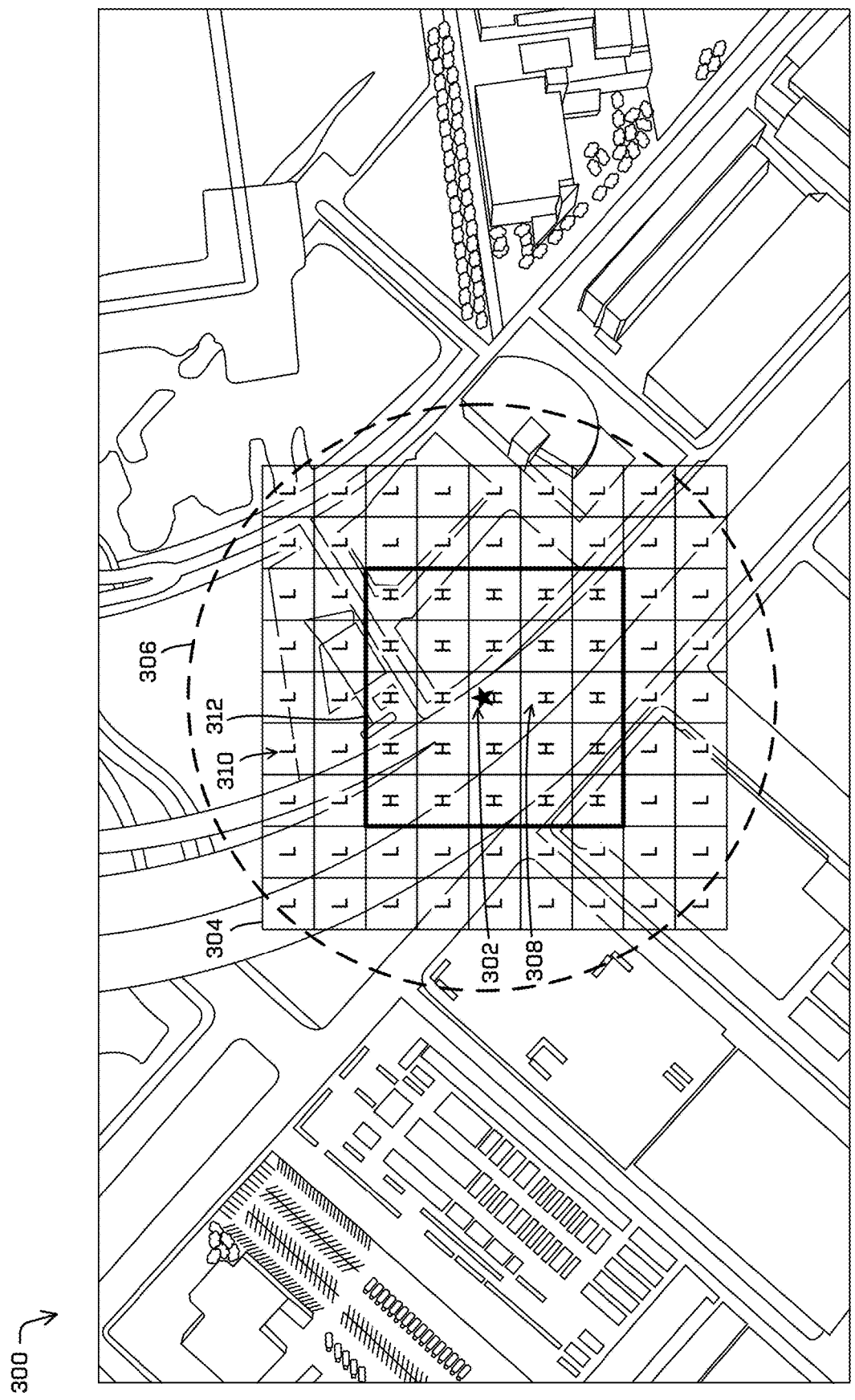
FIG. 3 is an illustration of an autonomous vehicle in an environment, wherein map data is overlaid in the illustration representing a resolution of map data loaded into memory based on a distance between an autonomous vehicle and a corresponding region of an environment, in accordance with embodiments of the disclosure.

FIG. 3 is an illustration of an autonomous vehicle in an environment 300, wherein map data is overlaid in the illustration representing a resolution of map data loaded into memory based on a distance between an autonomous vehicle and a corresponding region of an environment, in accordance with embodiments of the disclosure.

A vehicle 302 is illustrated in the environment 300 as a star that is substantially in the center of a map grid 304. In some instances, a sensor range 306 of the vehicle 302 is represented as the dashed circle. That is, in some cases, the map grid 304 may represent an area that is smaller than the sensor range 306, although in some instances, the sensor range 306 can be smaller than an area represented by the map grid 304. As illustrated, the map grid includes a 9×9 grid of map tiles, although any number and size of a map grid can be used, as discussed below in connection with FIGS. 4A-4D. In some instances, a size of the map grid 304 can be based at least in part on an effective sensor range (e.g., based on weather, light, time of day, etc.) and/or an available amount of memory. In some instances, the techniques discussed herein can lower an amount of memory required to store map data (compared to conventional techniques) and/or can increase a size of a map grid while maintaining an amount of memory required to store map data (compared to conventional techniques).

As illustrated, the map grid 304 comprises at least an inner region 308 and an outer region 310 separated by a boundary 312. In some instances, the inner region 308 can comprise map tiles representing the environment 300 at a high resolution, as indicated by the "H" in the map grid 304. In some instances, the outer region 310 can comprise map tiles representing the environment 300 at a low resolution, as indicated by the "L" in the map grid 304.

FIGS. 4A-4D illustrate various loading patterns of map data, in accordance with embodiments of the disclosure.

Figure 4A:
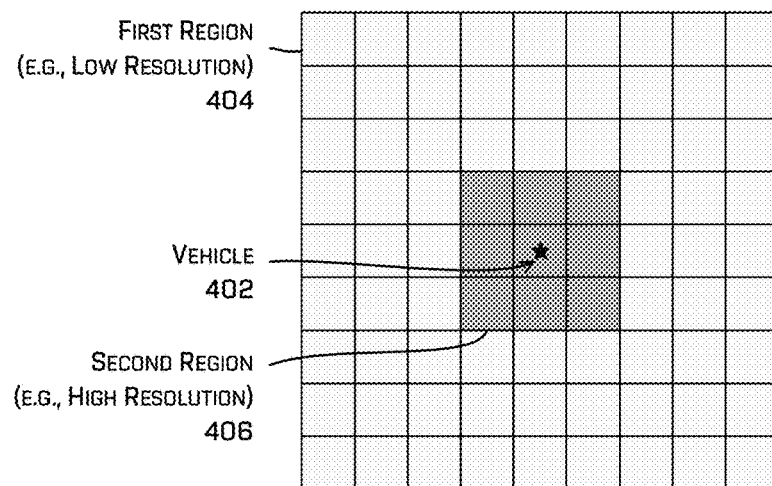
FIGS. 4A-4D illustrate various loading patterns of map data, in accordance with embodiments of the disclosure.

FIG. 4A illustrates an example of a map grid 400. A vehicle 402 is illustrated at the center of the map grid 400, although the vehicle 402 may be located in any region of the map grid 400. In some instances, the map grid 400 includes a 9×9 grid of map tiles, with a first region 404 including low-resolution map tiles and a second region 406 including high resolution map tiles. As illustrated, the second region 406 comprises a 3×3 grid of map tiles, illustrating that a size of the high-resolution region and a size of the low-resolution region can vary. In some instances, the size of the regions 404 and 406 can vary dynamically based on memory availability, localization accuracy (e.g., a number of localization points), a presence of localization information (e.g., whether sensor data representing a region is captured), vehicle properties (e.g., velocity), environmental factors (e.g., sensor range, weather, temperature, etc.) and the like.

Figure 4B:
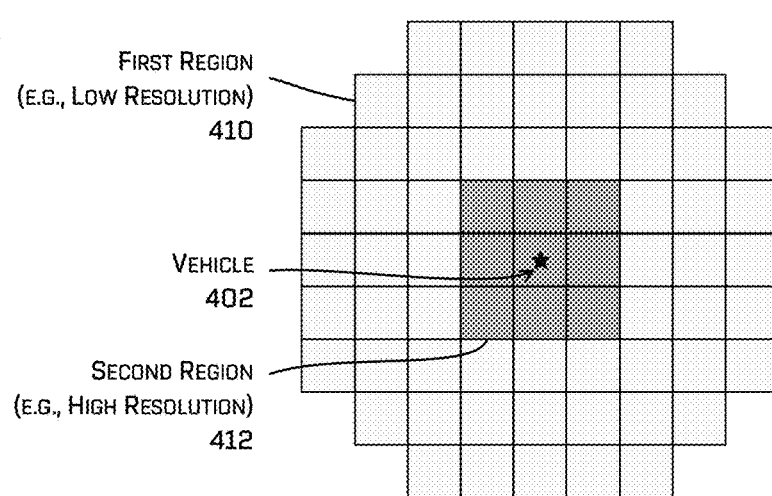

FIG. 4B illustrates an example of a map grid 408. The vehicle 402 is illustrated as residing in the center of the map grid 408, although the vehicle 402 can traverse throughout the map grid 408 in accordance with a trajectory. As can be understood, as the vehicle 402 traverses from a center region of the map grid 408 to region adjacent to the center region, the map grid 408 can be updated to re-center the map grid 408 around the vehicle 402 (and accordingly, individual tiles can be loaded or unloaded to and from memory, and/or resolutions of map data can be upgraded or downgraded, as discussed herein). As illustrated, the map grid 408 comprises a first region 410 (e.g., a low-resolution region) and a second region 412 (e.g., a high-resolution region). In some instances, the first region 410 can be a high-resolution region, while the second region 412 can be a low-resolution region, in accordance with various implementations.

Figure 4C:
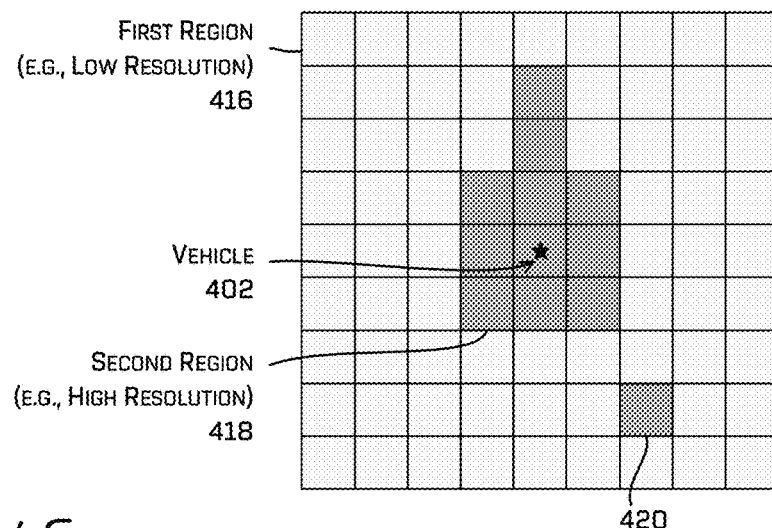

FIG. 4C illustrates an example of a map grid 414. In some instances, the map grid 408 comprises a first region 416 (e.g., a low-resolution region) and a second region 418 (e.g., a high-resolution region). In some instances, the map grid 414 may include additional regions in addition to the first region 416 and the second region 418. For example, the map grid 414 can include a region 420 that includes a high-resolution map tile that is not contiguous with the second region 418. In some examples, the region 420 can be loaded into memory based on a predetermined association with the location of the vehicle 402 in the map grid 414, based on determining a number of localization points are below a threshold (e.g., within the particular region 420 or within the map grid 414), and/or based on determining that the region 420 represents a portion of the environment that is particularly helpful to localize the vehicle 402 while the vehicle is at the current location.

Figure 4D:
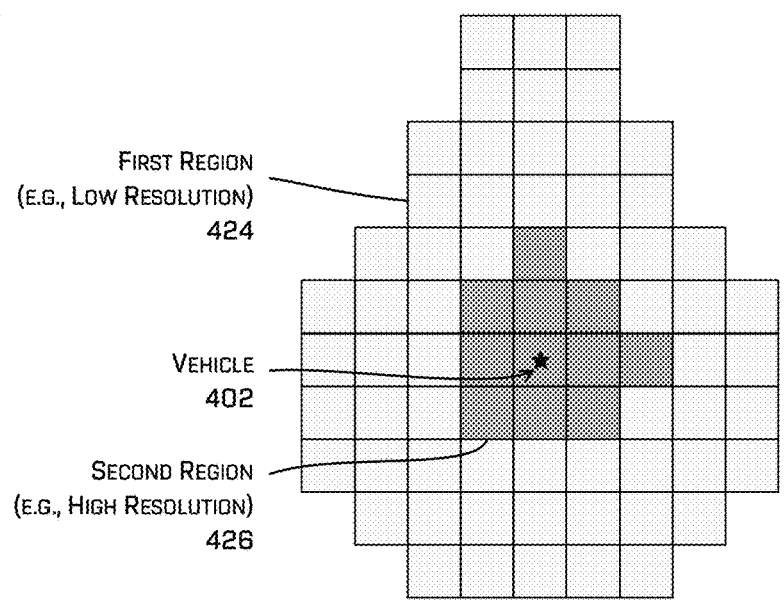

FIG. 4D illustrates an example of a map grid 422. In some examples, the map grid 422 illustrates a first region 424 and a second region 426. As illustrated, the various regions 424 and 426 do not need to be symmetrical with respect to a vertical axis or a horizontal axis. Further, the map grid 422 illustrates that the map grid 422 may be biased towards a direction of travel, or in any direction, based on example implementations. For example, the map grid 422 can be used when a speed of the vehicle is above a threshold speed to load more tiles in a direction of travel of the vehicle (e.g., in a case where the direction of travel is the vertical direction in FIG. 4D).

Figure 5:
FIG. 5 is an illustration of loading map data into memory based on a predetermined association between a location of a vehicle in an environment and map tiles representing the environment, in accordance with embodiments of the disclosure.

FIG. 5 is an illustration of a loading map data into memory based on a predetermined association between a location of a vehicle in an environment 500 and map tiles representing the environment 500, in accordance with embodiments of the disclosure.

A vehicle 502 is illustrated in the environment 500, which may include a building that occludes the vehicle 502 from capturing data of the environment 500. A map grid 504 corresponds to map data available to represent the environment 500. Without implementing the techniques discussed herein, map data associated with all regions of the map grid 504 can be naively loaded into a working memory. However, as illustrated in FIG. 5, the vehicle 502 is in a dense urban environment that limits an ability of the vehicle 502 to capture sensor data regarding the environment 500.

By way of example, the vehicle 502 may be proximate to a building in the environment 500, where a façade of the building is represented by a boundary 506. Areas of the map grid 504 that are populated by map data (e.g., regions for which a map tile is loaded into memory) are shaded as gray. As illustrated, an interior region 508 of the building 506 (where no sensor data can be captured) is not populated by map data, while a map data corresponding to the façade of the building 506 is represented as being populated in the region 510. By way of another example, map data associated with a region 516 may not be loaded into the memory and/or may not be associated with the location of the vehicle 502, as the map data associated with the region 516 may be determined not to contribute to localizing the vehicle 502 in the environment 500 and/or the region 516 is occluded from the vehicle 502. Accordingly, map tiles can be loaded into memory based on a usefulness of the map tile to localizing the vehicle, while refraining from loading map data into memory that may not be useful.

Examples of techniques for determining a level of detail (e.g., a decimation level) and for determining which regions of a 3D mesh are useful for localization are discussed in U.S. patent application Ser. Nos. 15/913,647 and 15/913,686, filed Mar. 6, 2018. Application Ser. Nos. 15/913,647 and 15/913,686 are herein incorporated by reference, in their entirety. Occluded regions may be either predetermined, or determined in accordance with systems and techniques described in U.S. patent application Ser. Nos. 16/011,436 and 16/011,468, filed Jun. 18, 2018. Application Ser. Nos. 16/011,436 and 16/011,468 are herein incorporated by reference, in their entirety.

In some instances, as a region 512 of map tiles to be loaded into memory may be less than the entire map grid 504, the map loading component 234 can determine that high-resolution map tiles can be loaded into memory without resorting to loading and unload low-resolution map tiles. That is, the map loading component 234 can select a level of detail for map tiles based on an available amount of memory relative to the amount of data to represent the environment 500. In accordance with the techniques discussed herein, map data corresponding to the unshaded region 514 may not be loaded into memory to improve the functioning of a computer by conserving memory resources. In at least some examples, such a system/technique may, additionally or alternatively, use unused portions of memory which would have otherwise been used with occluded tiles, to expand the total area of the grid 504. As a non-limiting example, the grid 504 illustrated in FIG. 5 may be augmented by loading additional tiles in a direction of travel of the vehicle 502.

Figure 6:
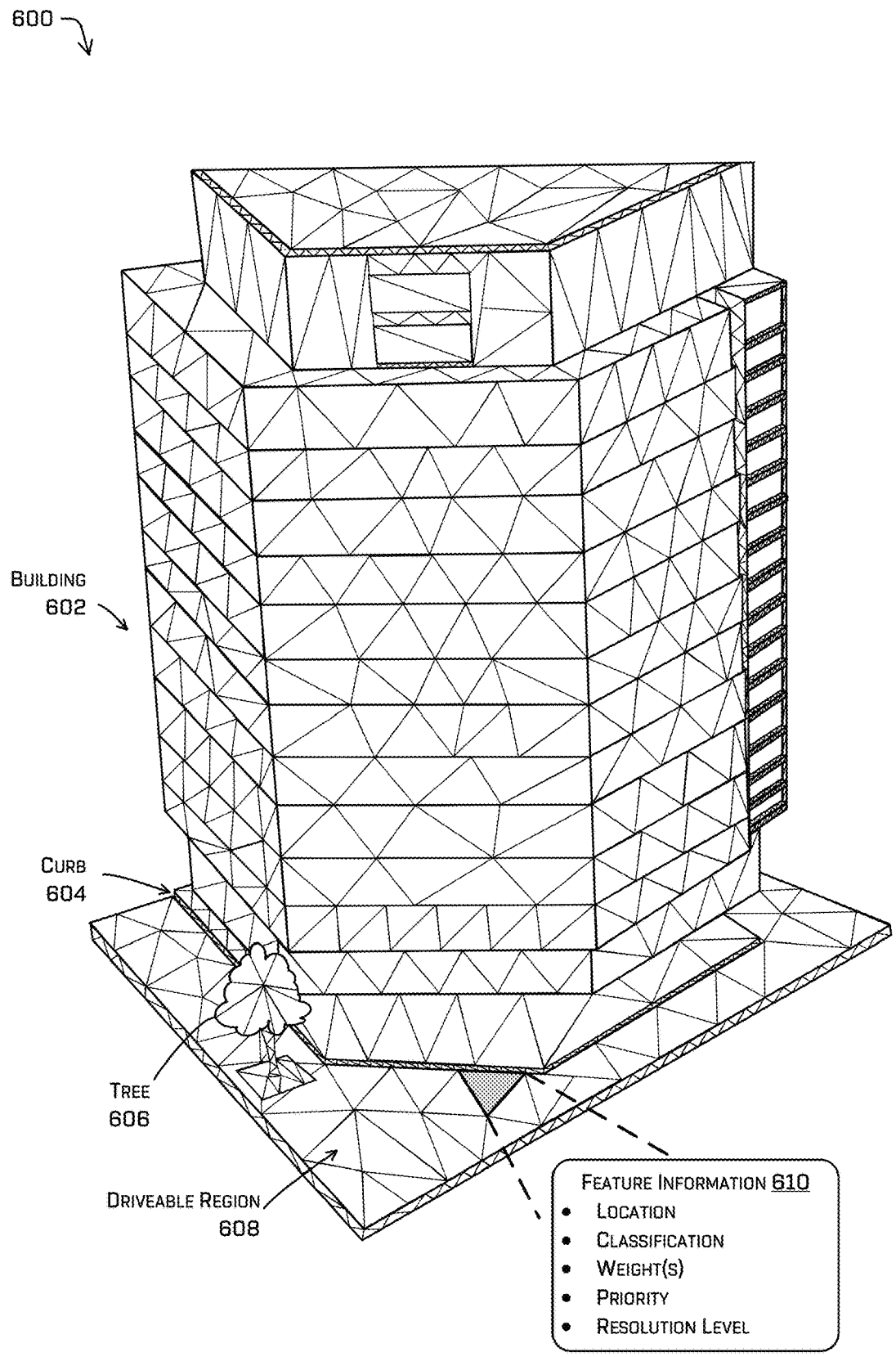
FIG. 6 is an illustration of a map tile comprising a three-dimensional mesh of an environment, as well as feature information associated with features of the map tile, in accordance with embodiments of the disclosure.

FIG. 6 is an illustration of a map tile comprising a three-dimensional mesh of a region 600 of an environment, as well as feature information associated with features of the map tile, in accordance with embodiments of the disclosure.

In some instance, the region 600 can correspond to the region 112, as illustrated in FIG. 1. For example, the region 600 can correspond to a corner of a building 602, and can further include features such as a curb 604, a tree 606, and/or a driveable region 608. In some instances, the three-dimensional (3D) mesh of the region 600 can comprise a plurality of polygons, such as triangles, that represent the environment at a particular resolution or level of detail. As discussed above, in some instances, a level of detail can correspond to a level of decimation or a level of polygons representing the region 600.

In some instances, individual polygons can be associated with feature information 610, which may include, but is not limited to, one or more of location information, classification information, weight(s), priority level(s), and/or resolution level(s). For example, feature information for a first polygon may include a location on the mesh and/or in the region 600 or environment, a classification of the polygon (e.g., a type of object that the polygon represents), weights associated with the polygon (for localization and/or for determining a confidence associated with a location), a priority level (e.g., a relative weight associated with loading features into memory), and/or a resolution level (e.g., low, medium, high, etc.). Thus, in an example where a particular classification is to be loaded into memory (e.g., map data associated with a drivable region), the feature can be loaded if the feature information matches a loading criteria. Accordingly, region information can be selected and loaded dynamically to provide fine control associated with a type and/or amount of data to be loaded into memory.

Figure 7:
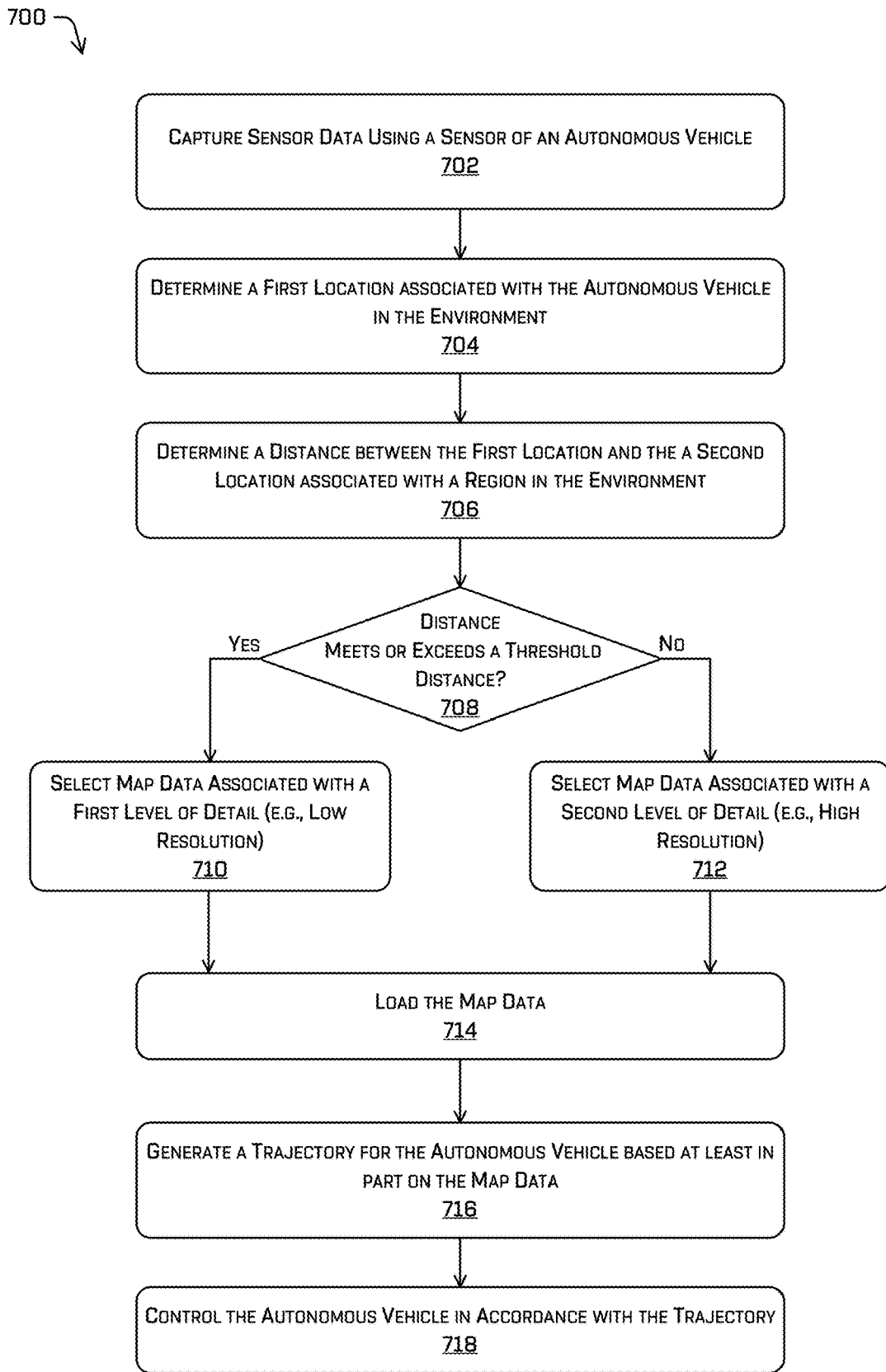
FIG. 7 depicts an example process for loading map data into a memory based at least in part on a distance between an autonomous vehicle and a region of an environment, in accordance with embodiments of the disclosure.
Figure 8:
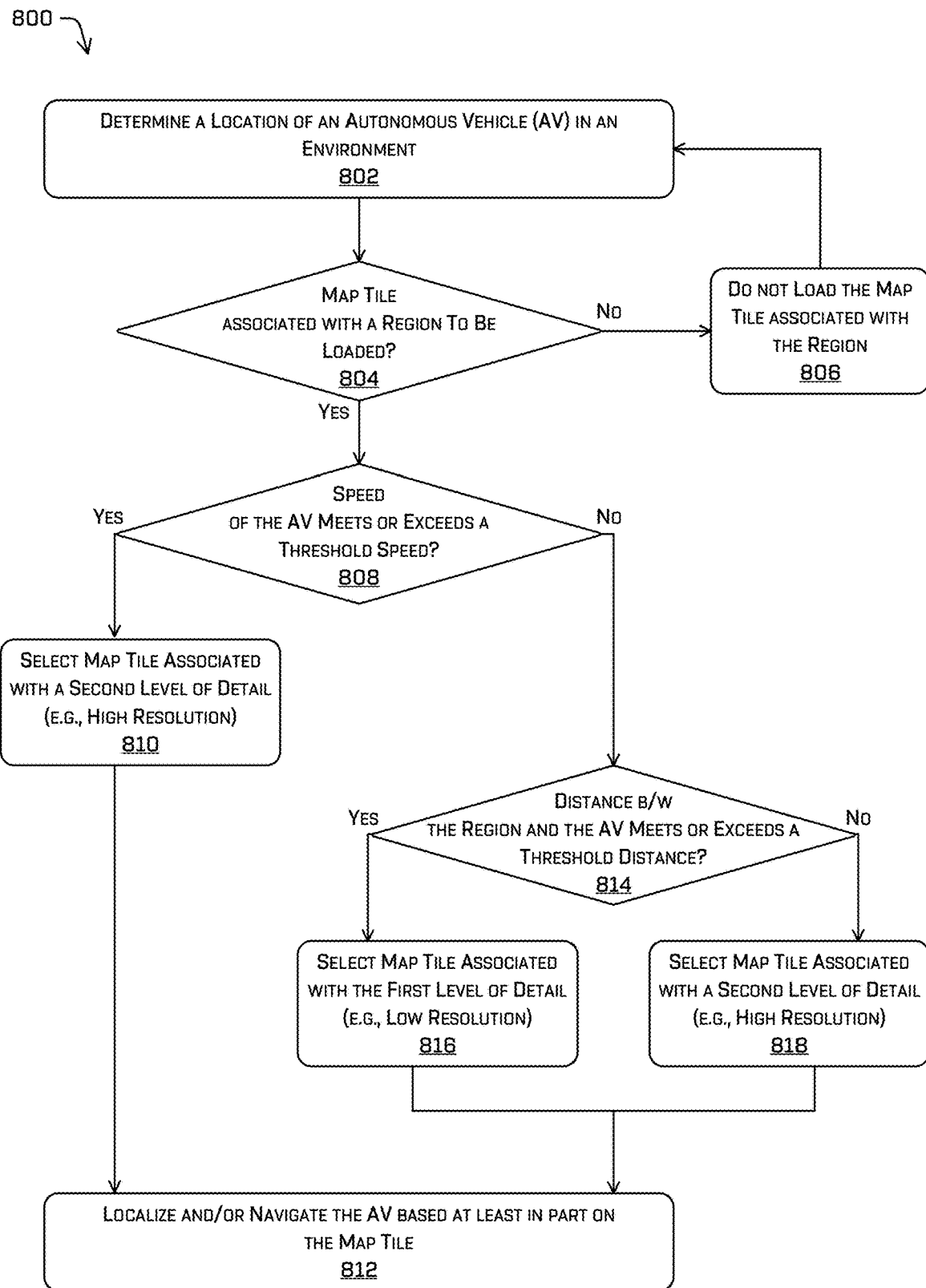
FIG. 8 depicts an example process for determining whether to load a map tile based on a location of an autonomous vehicle in an environment, and determining a level of detail of a map tile to load based at least in part on a speed of the autonomous vehicle and/or a distance between the autonomous vehicle and a region in the environment, in accordance with embodiments of the disclosure.

FIGS. 1, 7, and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 7 depicts an example process 700 for loading map data into a memory based at least in part on a distance between an autonomous vehicle and a region of an environment, in accordance with embodiments of the disclosure. For example, some or all of the process 700 can be performed by one or more components in FIG. 2, as described herein. For example, some or all of the process 700 can be performed by the vehicle computing device(s) 204.

At operation 702, the process can include capturing sensor data using a sensor of an autonomous vehicle. In some examples, the sensor data may include any sensor modality, including, but not limited to LIDAR data captured by a LIDAR sensor. In some instances, the process 700 can be performed by a non-autonomous vehicle, by a sensor system, or by a robotic platform, and is not limited to autonomous vehicles.

At operation 704, the process can include determining a first location associated with the autonomous vehicle in the environment. In some instances, the operation 704 can include determining a location of the autonomous vehicle and/or a location of a map tile in which the autonomous vehicle is located. In some instances, the operation 704 can be based on the sensor data captured in the operation 702, or can be based on other information (e.g., GPS information).

At operation 706, the process can include determining a distance between the first location associated with the autonomous vehicle and a second location associated with a region in an environment. For example, the operation 706 can include determining a distance between a center of the map tile in which the autonomous vehicle is currently location and a center of the map tile associated with the region. In some instances, the region corresponds to a region for which map data is to be loaded into a memory. In some instances, as an alternative to determining a distance, the operation 706 can include determining whether the region is within an inner region of a map grid (e.g., a 3×3, 3×4, M×N, etc. region around the vehicle), for example.

At operation 708, the process can include determining whether the distance meets or exceeds a threshold distance. In some instances, the threshold distance can be set statically or dynamically, as discussed herein. If "yes" in the operation 708 (e.g., the distance meets or exceeds the threshold distance), the process continues to operation 710.

At operation 710, the process can include selecting map data associated with a first level of detail. In some examples, the first level of detail can correspond to a low-resolution representation of the region. In some examples, the first level of detail can correspond to a high-resolution representation of the region. In some examples, the level of detail can correspond to a decimation level or a number of polygons representing the region in a three-dimensional mesh.

If the distance does not meet or exceed the threshold distance (e.g., "no" in the operation 708), the process continues to operation 712.

At operation 712, the process can include selecting map data associated with a second level of detail. In some examples, the second level of detail can correspond to a high-resolution representation of the region. In some examples, the second level of detail can correspond to a low-resolution representation of the region. In some examples, the level of detail can correspond to a decimation level or a number of polygons representing the region in a three-dimensional mesh.

At operation 714, the process can include loading the map data. In some instances, the operation 714 can include loading the map data into a working memory, which, in some examples, is associated with a graphics processing unit (GPU). In some instances, the GPU can correspond to the processor(s) 216 of the vehicle computing device 204 of FIG. 2. In some instances, the operation 714 can include copying the map data from a storage memory (e.g., a hard disk or a hard drive) to the working memory associated with the GPU.

At operation 716, the process can include generating a trajectory for the autonomous vehicle based at least in part on the map data. For example, the operation 716 can include localizing the autonomous vehicle in the environment using the map data loaded into the memory in the operation 714 and/or using the sensor data captured by the sensors discussed in the operation 702.

At operation 718, the process can include controlling the autonomous vehicle in accordance with the trajectory. For example, the autonomous vehicle may be controlled to follow the trajectory, within technical limitations and/or within environmental constraints.

FIG. 8 depicts an example process 800 for determining whether to load a map tile based on a location of an autonomous vehicle in an environment, and determining a level of detail of a map tile to load based at least in part on a speed of the autonomous vehicle and/or a distance between the autonomous vehicle and a region in the environment, in accordance with embodiments of the disclosure. For example, some or all of the process 800 can be performed by one or more components in FIG. 2, as described herein. For example, some or all of the process 800 can be performed by the vehicle computing device(s) 204.

At operation 802, the process can include determining a location of an autonomous vehicle in an environment. In some cases, the operation 802 can include capturing LIDAR data, RADAR data, SONAR data, image data, GPS data, and the like, to determine a location of the vehicle in the environment. In some instances, the operation 802 can include utilizing a localization algorithm to determine the vehicle location in an environment.

At operation 804, the process can include determining whether a map tile associated with a region in the environment is to be loaded into memory. In some instances, determining whether the map tile associated with a particular region is to be loaded into memory is based at least in part on the location of the vehicle in the environment. For example, the operation 804 can include determining whether the region is precomputed or predetermined to be associated with the location in the environment. In at least other examples, such a determination may be based on, for example, a distance, a determination of occlusion, a velocity of the autonomous vehicle, and the like (e.g., as above). As discussed herein, in some examples, a particular location in the environment can be associated with a set of map tiles that contribute to localizing the vehicle in the environment. In some cases, the set of tiles can include an indication of a resolution or level of detail associated with each tile to be loaded into memory in the set of tiles. If the map tile associated with the region is not to be loaded into memory (e.g., "no" in the operation 804), the process continues to operation 806.

At operation 806, the process can include refraining from loading the map tile associated with the region into memory. In some cases, the process can continue to the operation 802 to determine the location of the vehicle and to load map tiles in accordance with the techniques discussed herein.

If the map tile associated with the region is to be loaded (e.g., "yes" in the operation 804), the process continues to operation 808.

At operation 808, the process can include determining whether a speed of the autonomous vehicle meets or exceeds a threshold speed. In some instances, there may not be a threshold, and instead a level of detail or resolution can be based at least in part on a speed, for example. If "yes", the operation continues to operation 810. In some instances, the threshold speed can be based at least in part on an amount of time required to load/unload data from the working memory, and in some instances, the threshold speed can be based at least in part on an estimated or predicted amount of time for a vehicle to remain within a map tile (e.g., leaving the map tile might trigger updating a map grid and the loading/unloading of other tiles).

At operation 810, the process can include selecting a map tile associated with a second level of detail. In some examples, the second level of detail can be a higher level of detail (or a higher resolution) relative to a first level of detail, discussed below. In some instances, the operation 810 can include loading additional map tiles into memory in a direction of travel of the vehicle, based at least in part on the speed of the vehicle being above the threshold speed. In some instances, the operation 810 can include selecting tiles at a first level of detail if the speed meets or exceeds a threshold speed. That is, the operation 810 can be implemented in a flexible manner, and the specific resolution and/or speed used for selecting tiles can be based on a particular implementation. In some instances, upon selecting the map tile in the operation 810, the process can continue to operation 812.

At operation 812, the process can include localizing and/or navigating the autonomous vehicle based at least in part on the map tile.

If the speed does not meet or exceed the threshold speed (e.g., "no" in the operation 808), the process continues to operation 814.

At operation 814, the process can include determining whether the distance between a location associated with the region and a location associated with the autonomous vehicle meets or exceeds a threshold distance. In some instances, the operation 814 can correspond to the operation 708 in FIG. 7. If the distance meets or exceeds the threshold distance (e.g., "yes" in the operation 814), the process continues to operation 816.

At operation 816, the process can include selecting a map tile associated with a first level of detail. In some examples, the first level of detail can correspond to a low-resolution representation of the region. In some examples, the first level of detail can correspond to a high-resolution representation of the region. In some examples, the level of detail can correspond to a decimation level or a number of polygons representing the region in a three-dimensional mesh. In some instances, the operation 816 can include loading the map tile into a memory (e.g., a working memory associated with a GPU).

If the distance does not meet or exceed the threshold distance (e.g., "no" in the operation 814), the process continues to operation 818.

At operation 818, the process can include selecting map data associated with a second level of detail. In some examples, the second level of detail can correspond to a high-resolution representation of the region. In some examples, the second level of detail can correspond to a low-resolution representation of the region. In some examples, the level of detail can correspond to a decimation level or a number of polygons representing the region in a three-dimensional mesh. In some instances, the operation 818 can include loading the map tile into a memory (e.g., a working memory associated with a GPU).

Upon selecting a level of detail for the map tile and loading the appropriate map tile into memory (operations 816 and 818), the process can continue to the operation 812, which includes localizing the autonomous vehicle in the environment and/or navigating the autonomous vehicle based at least in part on the map tile.

EXAMPLE CLAUSES

A: A system comprising: one or more processors; and one or more computer-readable media storing instructions executable by the one or more processors, wherein the instructions, when executed, cause the system to perform operations comprising: capturing LIDAR data using a LIDAR sensor of an autonomous vehicle; determining, based at least in part on the LIDAR data, a first location associated with the autonomous vehicle in an environment; determining a distance between the first location and a second location associated with a region in the environment; determining that the distance meets or exceeds a threshold distance; selecting, based at least in part on the distance meeting or exceeding the threshold distance, a resolution level from at least a first resolution level and a second resolution level; loading, into a working memory accessible to the one or more processors, map data associated with the region, wherein the region in the environment is represented at the resolution level in the map data; and localizing the autonomous vehicle based at least in part on the map data and the LIDAR data.

B: The system of paragraph A, wherein the first location is associated with a first time, wherein the distance is a first distance associated with the first time, wherein the resolution level is the first resolution level, and wherein the map data is first map data, the operations further comprising: determining a second distance between a third location of the autonomous vehicle and the second location associated with the region in the environment at a second time; determining that the second distance is below the threshold distance; selecting, based at least in part on the second distance being below the threshold distance, the second resolution level, wherein the second resolution level is higher than the first resolution level; unloading, from the working memory and based at least in part on second distance being below the threshold distance, the first map data; and loading, into the working memory, second map data associated with the region, wherein the second map data represents the region in the environment at the second resolution level.

C: The system of paragraph B, wherein the region is a first region, the operations further comprising: determining that third map data is stored in the working memory, wherein the third map data represents a second region in the environment at the second resolution level; determining a third distance between the third location associated with the autonomous vehicle and a fourth location associated with the second region in the environment; determining that the third distance meets or exceeds the threshold distance; unloading, from the working memory and based at least in part on the third distance meeting or exceeding the threshold distance, the third map data; and loading, into the working memory, fourth map data associated with the second region, wherein the fourth map data represents the second region in the environment at the first resolution level.

D: The system of any of paragraphs A-C, wherein the map data comprises a three-dimensional mesh of the region in the environment.

E: The system of any of paragraphs A-D, wherein: the resolution level is the first resolution level; the map data comprises a map tile representing the region in the environment; an area representing a least a portion of the environment around the autonomous vehicle is represented by a plurality of map tiles individually loaded into the working memory; a first portion of the area is represented by one or more first map tiles associated with the first resolution level; and a second portion of the area is represented by one or more second map tiles associated with the second resolution level that is different than the first resolution level.

F: A method comprising: determining a first location associated with a sensor system in an environment; determining a distance between the first location and a second location associated with a region in the environment; loading, into a working memory associated with a computing device of the sensor system, map data representing the region in the environment, wherein a level of detail associated with the map data is based at least in part on the distance; capturing, by the sensor system, sensor data; and performing an action based at least in part on the map data and the sensor data, wherein the action includes at least one of a localization action, a perception action, a prediction action, or a planning action.

G: The method of paragraph F, the localization action further comprising: receiving LIDAR data captured by a LIDAR sensor of the sensor system; and localizing the sensor system in the environment based at least in part on the LIDAR data and the map data.

H: The method of paragraph F or G, wherein the first location is associated with a first time, wherein the distance is a first distance associated with the first time, wherein the map data is first map data, and wherein the level of detail is a first level of detail, the method further comprising: determining a third location associated with the sensor system at a second time; determining a second distance between the third location and the second location associated with the region in the environment; determining that the second distance is under a threshold distance; unloading, from the working memory, the first map data; and loading, into the working memory, second map data representing the region of the environment at a second level of detail.

I: The method of paragraph H, the method further comprising: determining a fourth location associated with the sensor system at a third time; determining a third distance between the fourth location and the second location associated with the region at the third time; determining that the third distance meets or exceeds the threshold distance; unloading, from the working memory, the second map data; and loading, into the working memory, the first map data representing the region of the environment at the first level of detail.

J: The method of paragraph H or I, wherein the second level of detail comprises a higher level of detail than the first level of detail.

K: The method of any of paragraphs H-J, wherein the first map data comprises a first three-dimensional (3D) mesh associated with a first decimation level and the second map data comprises a second 3D mesh associated with a second decimation level.

L: The method of any of paragraphs F-K, wherein the working memory is random access memory accessible to a graphics processing unit.

M: The method of any of paragraphs F-L, wherein: the level of detail is a first level of detail; the map data comprises a map tile representing the region in the environment; an area representing a least a portion of the environment around the sensor system is represented by a plurality of map tiles individually loaded into the working memory; a first portion of the area is represented by one or more first map tiles associated with the first level of detail; and a second portion of the area is represented by one or more second map tiles associated with a second level of detail that is different than the first level of detail.

N: The method of any of paragraphs F-M, wherein: the map data is one of a plurality of map tiles representing an area of the environment; a size of the area is based at least in part on a range of a sensor of the sensor system; and wherein a number of map tiles of the plurality of map tiles is based at least in part on a size of the working memory allocated to localizing the sensor system or a memory size of individual tiles of the plurality of map tiles.

O: The method of any of paragraphs F-N, further comprising: loading, into the working memory and based at least in part on a predetermined association between the first location associated with the sensor system and the first location, a plurality of map tiles, wherein the predetermined association includes a level of detail associated with a map tile of the plurality of map tiles.

P: A non-transitory computer-readable medium storing instructions that, when executed, cause one or more processors to perform operations comprising: determining a first location associated with a sensor system in an environment; determining a distance between the first location and a second location associated with a region in the environment; loading, into a working memory associated with a computing device of the sensor system, map data representing the region in the environment, wherein a level of detail associated with the map data is based at least in part on the distance; capturing, by the sensor system, sensor data; and performing an action based at least in part on the map data and the sensor data, wherein the action includes at least one of a localization action, a perception action, a prediction action, or a planning action.

Q: The non-transitory computer-readable medium of paragraph P, wherein the first location is associated with a first time, wherein the distance is a first distance associated with the first time, wherein the map data is first map data, and wherein the level of detail is a first level of detail, the operations further comprising: determining a third location associated with the sensor system at a second time; determining a second distance between the third location and the second location associated with the region in the environment; determining that the second distance is under a threshold distance; unloading, from the working memory, the first map data; and loading, into the working memory, second map data representing the region of the environment at a second level of detail.

R: The non-transitory computer-readable medium of paragraph Q, the operations further comprising: determining a fourth location associated with the sensor system at a third time; determining a third distance between the fourth location and the second location associated with the region at the third time; determining that the third distance meets or exceeds the threshold distance; unloading, from the working memory, the second map data; and loading, into the working memory, the first map data representing the region of the environment at the first level of detail.

S: The non-transitory computer-readable medium of paragraph Q or R, wherein the first map data comprises a first three-dimensional (3D) mesh associated with a first decimation level and the second map data comprises a second 3D mesh associated with a second decimation level, the first decimation level differing from the second decimation level.

T: The non-transitory computer-readable medium of any of paragraphs P-S, wherein: the level of detail is a first level of detail; the map data comprises a map tile representing the region in the environment; an area representing a portion of the environment around the sensor system is represented by a plurality of map tiles individually loaded into the working memory; a first portion of the area is represented by one or more first map tiles associated with the first level of detail; and a second portion of the area is represented by one or more second map tiles associated with a second level of detail that is different than the first level of detail.

U: A system comprising: one or more processors; and one or more computer-readable media storing instructions executable by the one or more processors, wherein the instructions, when executed, cause the system to perform operations comprising: determining a location of an autonomous vehicle in an environment; loading, into a working memory accessible to the one or more processors, a plurality of map tiles, a map tile representing a region of the environment at a particular level of detail, wherein the map tile is selected based at least in part on a predetermined association between the location of the autonomous vehicle and the region; capturing LIDAR data using a LIDAR sensor of the autonomous vehicle; localizing the autonomous vehicle in the environment based, at least in part, on the map tile and the LIDAR data; generating a trajectory for the autonomous vehicle based at least in part on localizing the autonomous vehicle in the environment; and controlling the autonomous vehicle to follow the trajectory.

V: The system of paragraph U, wherein the predetermined association comprises a list of map tiles to be loaded into the working memory based at least in part on the autonomous vehicle being at the location, the map tiles associated with a level of detail.

W: The system of paragraph U or V, the operations further comprising: determining that the region of the environment is un-occluded.

X: The system of any of paragraphs U-W, the operations further comprising: selecting the particular level of detail for the map tile based at least in part on a speed of the autonomous vehicle.

Y: The system of any of paragraphs U-X, wherein the map tile comprises a three-dimensional mesh representing region of the environment.

Z: A method comprising: determining a location of a sensor system in an environment; determining to load, into a working memory, a map tile representing a region of the environment, wherein the determining to load is based at least in part on: determining that a sensor of the sensor system can capture sensor data representing the region; or accessing a predetermined association between the location of the sensor system and the region of the environment, wherein the predetermined association indicates the map tile of a set of map tiles and a level of detail of the map tile of the set of map tiles; loading, into the working memory, the map tile representing the region; capturing, by the sensor system, sensor data; and performing an action based at least in part on the map tile and the sensor data, wherein the action includes at least one of a localization action, a perception action, a prediction action, or a planning action.

AA: The method of paragraph Z, wherein the sensor comprises an autonomous vehicle and wherein the planning action comprises: generating a trajectory for the autonomous vehicle; and controlling the autonomous vehicle in accordance with the trajectory.

AB: The method of paragraph Z or AA, wherein determining that a sensor of the sensor system can capture sensor data representing the region comprises determining whether the region is occluded.

AC: The method of paragraph AB, wherein the map tile is a first map tile, the method further comprising: selecting, based on determining that the region is occluded, a second region of the environment; and loading a second map tile representing the second region into the working memory.

AD: The method of any of paragraphs Z-AC, further comprising: determining, based at least in part on a speed of the sensor system moving through the environment, the level of detail of the map tile to load into the working memory.

AE: The method of any of paragraphs Z-AD, wherein the level of detail is a first level of detail, the method further comprising: determining a direction of travel of the sensor system; determining the level of detail of the map tile based at least in part on the direction of travel; and loading, into the working memory as the map tile, a first map tile representing the region at a second level of detail.

AF: The method of any of paragraphs Z-AE, wherein the map tile comprises a first map tile associated with a first level of detail, the method further comprising: localizing the sensor system based at least in part on the first map tile; determining that a number of localization points is below a threshold number of points or that a localization confidence level is below a threshold confidence level; and loading, into the working memory as the map tile and based at least in part on the number of localization points being below the threshold number of points or based at least in part on the localization confidence level being below the threshold confidence level, a second map tile associated with a second level of detail that is higher than the first level of detail.

AG: The method of any of paragraphs Z-AF, wherein the map tile comprises a plurality of features, a feature of the plurality of features comprising semantic information associated with a level of detail, and wherein the loading the map tile into the working memory comprises loading the feature into the working memory based at least in part on the semantic information.

AH: The method of any of paragraphs Z-AG, further comprising: loading the map tile from a non-volatile memory into the working memory, wherein the working memory is accessible to a graphics processing unit.

AI: A non-transitory computer-readable medium storing instructions that, when executed, cause one or more processors to perform operations comprising: determining a location associated with a sensor system in an environment; determining to load, into a working memory, a map tile representing a region of the environment, wherein the determining to load is based at least in part on: determining that the region is un-occluded to a sensor of the sensor system; or accessing a predetermined association between the location of the sensor system and the region of the environment, wherein the predetermined association indicates the map tile of a set of map tiles and a level of detail of the map tile of the set of map tiles; capturing, by the sensor system, sensor data; and performing an action based at least in part on the map tile and the sensor data, wherein the action includes at least one of a localization action, a perception action, a prediction action, or a planning action.

AJ: The non-transitory computer-readable medium of paragraph AI, the operations further comprising: determining, based at least in part on a speed of the sensor system moving through the environment, the level of detail of the map tile to load into the working memory.

AK: The non-transitory computer-readable medium of paragraph AJ, wherein the level of detail is a first level of detail, the operations further comprising: determining a direction of travel of the sensor system; determining the level of detail of the map tile based at least in part on the direction of travel; and loading, into the working memory as the map tile, a first map tile representing the region at a second level of detail.

AL: The non-transitory computer-readable medium of paragraph AK, the operations further comprising: determining that the region is occluded; and loading the map tile into the working memory based on the predetermined association and despite the region being occluded.

AM: The non-transitory computer-readable medium of any of paragraphs AI-AL, wherein the set of map tiles comprises a subset of available tiles associated with a region proximate to the sensor system.

AN: The non-transitory computer-readable medium of any of paragraphs AI-AM, wherein the map tile of the set of map tiles is selected based on a contribution of the map tile to localizing the sensor system at the location in the environment.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more computer-readable media storing instructions executable by the one or more processors, wherein the instructions, when executed, cause the system to perform operations comprising:
    determining a location of an autonomous vehicle in an environment;
    loading, into a working memory accessible to the one or more processors, a plurality of map tiles, a map tile of the plurality of map tiles representing a region of the environment at a particular level of detail associated with a relative number of polygons representing the map tile, wherein the map tile is selected based at least in part on a predetermined association between the location of the autonomous vehicle and the region;
    capturing LIDAR data using a LIDAR sensor of the autonomous vehicle;
    localizing the autonomous vehicle in the environment based, at least in part, on the map tile and the LIDAR data;
    generating a trajectory for the autonomous vehicle based at least in part on localizing the autonomous vehicle in the environment; and
    controlling the autonomous vehicle to follow the trajectory.

2. The system of claim 1, wherein the predetermined association comprises a list of map tiles to be loaded into the working memory based at least in part on the autonomous vehicle being at the location, the map tiles associated with a level of detail.

3. The system of claim 1, the operations further comprising:
    determining that the region of the environment is un-occluded.

4. The system of claim 1, the operations further comprising:
    selecting the particular level of detail for the map tile based at least in part on a speed of the autonomous vehicle.

5. The system of claim 1, wherein the map tile comprises a three-dimensional mesh representing the region of the environment.

6. A method comprising:
    determining a location of a sensor system in an environment;
    determining to load, into a working memory, a map tile representing a region of the environment, wherein the determining to load is based at least in part on:
        determining that a sensor of the sensor system can capture sensor data representing the region; or
        accessing a predetermined association between the location of the sensor system and the region of the environment, wherein the predetermined association indicates the map tile of a set of map tiles and a level of detail of the map tile of the set of map tiles, wherein the level of detail is associated with a relative number of polygons representing the map tile;
    loading, into the working memory, the map tile representing the region;
    capturing, by the sensor system, sensor data; and
    performing an action based at least in part on the map tile and the sensor data, wherein the action includes at least one of a localization action, a perception action, a prediction action, or a planning action.

7. The method of claim 6, wherein the sensor system is associated with an autonomous vehicle, wherein the action comprises the planning action, and wherein the planning action comprises:
    generating a trajectory for the autonomous vehicle; and
    controlling the autonomous vehicle in accordance with the trajectory.

8. The method of claim 6, wherein the determining to load is based at least in part on the determining that the sensor of the system can capture the sensor data representing the region, and wherein determining that the sensor of the sensor system can capture the sensor data representing the region comprises determining whether the region is occluded.

9. The method of claim 8, wherein the map tile is a first map tile, the method further comprising:
    selecting, based on determining that the region is occluded, a second region of the environment; and
    loading a second map tile representing the second region into the working memory.

10. The method of claim 6, further comprising:
    determining, based at least in part on a speed of the sensor system moving through the environment, the level of detail of the map tile to load into the working memory.

11. The method of claim 6, wherein the level of detail is a first level of detail, the method further comprising:
    determining a direction of travel of the sensor system;
    determining the level of detail of the map tile based at least in part on the direction of travel; and
    loading, into the working memory as the map tile, a first map tile representing the region at a second level of detail.

12. The method of claim 6, wherein the map tile comprises a first map tile associated with a first level of detail, the method further comprising:
    localizing the sensor system based at least in part on the first map tile;
    determining that a number of localization points is below a threshold number of points or that a localization confidence level is below a threshold confidence level; and
    loading, into the working memory as the map tile and based at least in part on the number of localization points being below the threshold number of points or based at least in part on the localization confidence level being below the threshold confidence level, a second map tile associated with a second level of detail that is higher than the first level of detail.

13. The method of claim 6, wherein the map tile comprises a plurality of features, a feature of the plurality of features comprising semantic information associated with a level of detail, and wherein the loading the map tile into the working memory comprises loading the feature into the working memory based at least in part on the semantic information.

14. The method of claim 6, further comprising:
    loading the map tile from a non-volatile memory into the working memory, wherein the working memory is accessible to a graphics processing unit.

15. One or more non-transitory computer-readable media storing instructions that, when executed, cause one or more processors to perform operations comprising:
    determining a location associated with a sensor system in an environment;
    determining to load, into a working memory, a map tile representing a region of the environment, wherein the determining to load is based at least in part on:
        determining that the region is un-occluded to a sensor of the sensor system; or
        accessing a predetermined association between the location of the sensor system and the region of the environment, wherein the predetermined association indicates the map tile of a set of map tiles and a level of detail of the map tile of the set of map tiles, wherein the level of detail is associated with a relative number of polygons representing the map tile;

capturing, by the sensor system, sensor data; and performing an action based at least in part on the map tile and the sensor data, wherein the action includes at least one of a localization action, a perception action, a prediction action, or a planning action.

16. The one or more non-transitory computer-readable media of claim 15, the operations further comprising:

determining, based at least in part on a speed of the sensor system moving through the environment, the level of detail of the map tile to load into the working memory.

17. The one or more non-transitory computer-readable media of claim 16, wherein the level of detail is a first level of detail, the operations further comprising:

determining a direction of travel of the sensor system;

determining the level of detail of the map tile based at least in part on the direction of travel; and loading, into the working memory as the map tile, a first map tile representing the region at a second level of detail.

18. The one or more non-transitory computer-readable media of claim 17, the operations further comprising:

determining that the region is occluded; and loading the map tile into the working memory based on the predetermined association and despite the region being occluded.

19. The one or more non-transitory computer-readable media of claim 15, wherein the set of map tiles comprises a subset of available tiles associated with a region within a threshold distance to the sensor system.

20. The one or more non-transitory computer-readable media of claim 15, wherein the map tile of the set of map tiles is selected based on a contribution of the map tile to localizing the sensor system at the location in the environment.

* * * * *